UNITED STATES PATENT OFFICE.

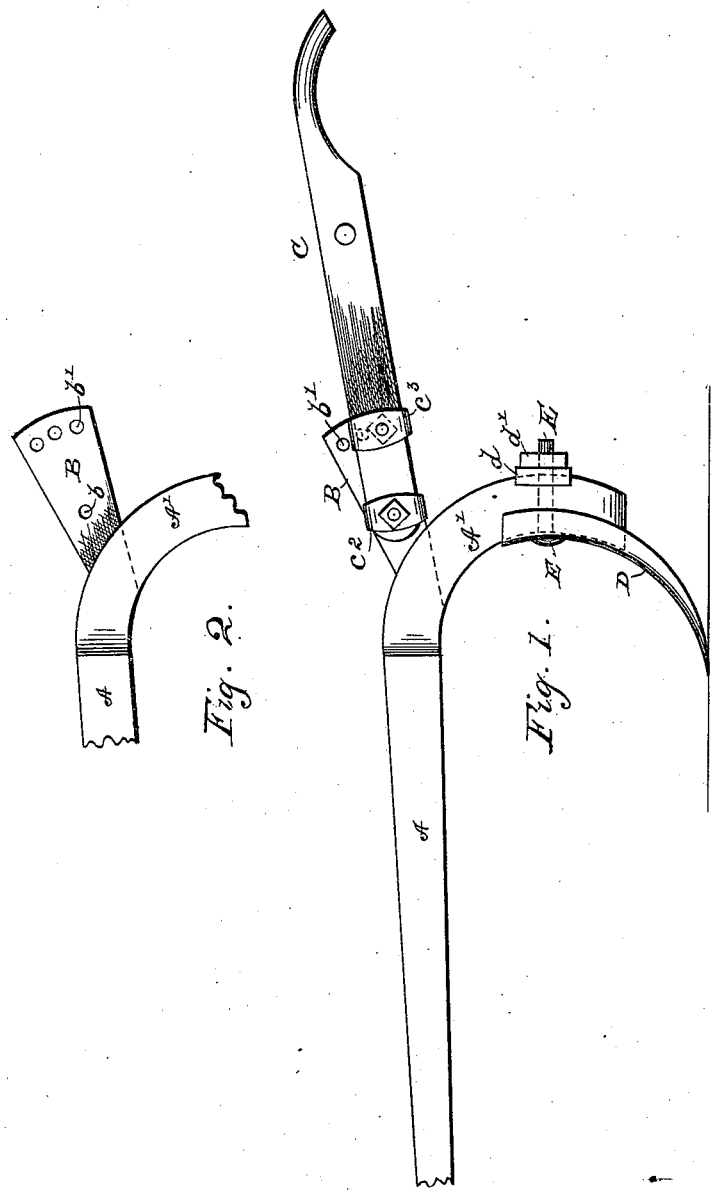

SILVARIEUS RUFUS MONTCALM, OF McDANIEL, ARKANSAS.

ADJUSTABLE PLOW-HANDLE.

SPECIFICATION forming part of Letters Patent No. 354,609, dated December 21, 1886.

Application filed October 8, 1886. Serial No. 215,677. (No model.)

*To all whom it may concern:*

Be it known that I, SILVARIEUS RUFUS MONTCALM, a citizen of the United States of America, residing at McDaniel, in the county of St. Francis and State of Arkansas, have invented certain new and useful Improvements in Adjustable Plow-Handles, of which the following is a specification, reference being had therein to the accompanying drawings.

The object of this improvement is to provide a handle for plows connected to the plow-beam in a manner to be conveniently adjusted to a higher or lower position, as occasion may require, for adapting the plow to be efficiently handled by persons of different stature. These results are attained by the means illustrated in the drawings herewith filed as a part hereof, in which the same letters of reference denote the same parts in the different views.

Figure 1 is a side elevation, partly in section, representing a plow provided with my improved handle. Fig. 2 is a longitudinal vertical section of the plow-beam. Fig. 3 represents a plan view of the handle detached.

A A' is the plow-beam, made of metal, the curved part A' of which is bifurcated or slotted for a purpose hereinafter set forth.

B is a projection from the beam, with which it may be made integral, or to which it may be affixed by any suitable means.

C is the plow-handle, which is pivotally secured to the part B by a bolt, C', having a clip-head, $c'$, and which is inserted in corresponding perforations in the handle and the perforation $b$ in the part B, after which it is provided with a flanged washer or clip-plate, $c^2$, which, with the similarly-formed bolt-head $c'$, will, when the nut on the bolt is tightened, cause the parts of the handle to be firmly bound to the part B. The outer end of the part B is provided with a series of perforations, $b'$, as fully shown in Fig. 2. The handle C is additionally secured to the part B by means of a bolt, $C^2$, having a clip-head, $c^3$, which is inserted in corresponding perforations in the handle and into either of the perforations $b'$, after which it is provided with a flanged washer or clip-plate, $C^4$, which, with the similarly-formed bolt-head $c^3$, will, when the nut is tightened, firmly secure the handle to the part B in a position which may be more or less elevated, according to the perforation of the series $b'$ into which the bolt $C^2$ may be inserted.

D is a shovel fixed to the beam by means of a bolt, E, which is passed through the bifurcated part of the beam and through a flanged washer, $d$, which forms a bearing for the nut $d'$, which, when tightened on the bolt, binds the shovel firmly to the beam. By reason of the bifurcation of the beam the nut E and shovel D may be moved up or down, and the shovel fixed to the beam in different relative positions for regulating the draft, as occasion may require.

The adjustment of the handle shown in Fig. 1 is adapted to persons of short stature. By reason of the series of perforations $b'$ in the part B and the handle C being pivotally connected thereto, the latter may be easily changed to and secured in a more elevated position.

I am aware that the adjustable connection of a plow-handle with the plow is not new, and I therefore do not claim such feature, broadly; but

What I claim, and desire to secure by Letters Patent, is—

The combination of the plow-handle provided at its inner end with a transverse bolt for pivotally attaching the handle to plow-beams, and an additional transverse bolt for securing the handle in an adjusted position, and a plow-beam having an integral bifurcated curve or shovel-helve, and an integral rearward extension provided with a perforation for the reception of the bolt for pivotally attaching the handle, and a series of perforations for receiving the bolt for securing the handle in an adjusted position, as shown and described.

In testimony whereof I affix my signature in presence of two witnesses.

SILVARIEUS RUFUS MONTCALM.

Witnesses:
   G. A. CRAWFORD,
   JAMES LYNOUGH.